United States Patent [19]

Saito et al.

[11] Patent Number: 5,397,831
[45] Date of Patent: Mar. 14, 1995

[54] TETRAFLUOROETHYLENE COPOLYMER RESIN POWDER COMPOSITION AND PROCESS FOR MANUFACTURE THEREOF

[75] Inventors: Takumi Saito; Kasuke Ishii; Takao Nishio; Susumu Nakamura; Matunori Takada; Kazuhiro Yamamoto, all of Shimizu, Japan

[73] Assignee: Du Pont-Mitsui Fluorochemicals, Tokyo, Japan

[21] Appl. No.: 69,655

[22] Filed: Jun. 1, 1993

Related U.S. Application Data

[63] Continuation of Ser. No. 868,322, Apr. 14, 1992, abandoned.

[30] Foreign Application Priority Data

Apr. 17, 1991 [JP] Japan .................. 3-112408
Feb. 21, 1992 [JP] Japan .................. 4-069949

[51] Int. Cl.$^6$ .................. C08J 5/10; C08K 3/10; C08L 23/04
[52] U.S. Cl. .................. 524/502; 524/520; 524/521; 525/189; 525/197; 525/199
[58] Field of Search ........... 524/502, 520, 521, 494, 524/495, 434; 525/189, 197, 199

[56] References Cited

U.S. PATENT DOCUMENTS

| | | | |
|---|---|---|---|
| 4,714,756 | 12/1987 | Buckmaster | 528/481 |
| 4,914,158 | 4/1990 | Yoshimura et al. | 525/199 |
| 5,006,594 | 4/1991 | Rees | 524/520 |
| 5,093,403 | 3/1992 | Rau et al. | 524/404 |

FOREIGN PATENT DOCUMENTS

| | | | |
|---|---|---|---|
| 0252669 | 1/1988 | European Pat. Off. | C09D 3/28 |
| 0343015 | 11/1989 | European Pat. Off. | B05D 5/08 |
| 54-3172 | 2/1979 | Japan | C09D 5/00 |
| 0543172 | 2/1979 | Japan | C09D 5/00 |
| 57-14774 | 3/1982 | Japan | C08L 27/12 |
| 63-38065 | 7/1988 | Japan | C08L 27/18 |

Primary Examiner—Paul R. Michl
Assistant Examiner—U. K. Rajguru
Attorney, Agent, or Firm—Edwin Tocker

[57] ABSTRACT

This invention provides a tetrafluoroethylene (TFE) copolymer resin powder composition capable, upon rotational lining, of generating a corrosion-resistant, nonstick film, which is a thick film on a metal or a like substrate, essentially free of gas bubbles, and excellent in adhesion and peel resistance. The TFE-copolymer resin powder composition comprises granules which comprise particles of a TFE/perfluoro(alkyl vinyl ether) copolymer (PFA), polyphenylene sulfide (PPS) particles having an average particle size of 0.3-50 μm, and a heat resistant filler. This invention also provides a process for manufacturing the TFE copolymer resin powder composition comprising either (1) granulating a mixture of PFA particles, PPS and a heat resistant filler in the presence of water and an organic liquid, or (2) mixing PFA, PPS, and a heat-resistant filler, compression-molding, and pulverizing.

3 Claims, No Drawings

TETRAFLUOROETHYLENE COPOLYMER RESIN POWDER COMPOSITION AND PROCESS FOR MANUFACTURE THEREOF

This is a continuation of application Ser. No. 07/868,322 filed Apr. 14, 1992, now abandoned.

BACKGROUND OF THE INVENTION

1. Field of the Invention

The present invention relates to a tetrafluoroethylene copolymer resin powder composition capable of providing a highly corrosion- and chemical-resistant coating.

It further relates to a tetrafluoroethylene copolymer resin powder composition suitable for rotational lining processes to generate a thick coating which is essentially free of gas bubbles and which has strong adhesion to, and peel resistance from, a substrate.

2. Background

A copolymer (sometimes referred to hereinafter as PFA) obtained by copolymerizing tetrafluoroethylene (sometimes referred to hereinafter as TFE) with a perfluoro(alkyl vinyl ether) (sometimes referred to hereinafter as PFVE) is superior to other fluorinated polymers, particularly to polyvinylidene fluoride and ethylene/tetrafluoroethylene copolymers, with respect to heat resistance, chemical resistance, and electrical properties. PFA is different from polytetrafluoroethylene (sometimes referred to hereinafter as PTFE), a tetrafluoroethylene homopolymer, in that PFA is melt flowable at its melting point or above, so that it is extensively used as an excellent pinhole-free, or void-free, film-forming material.

Such film-forming material can be used to provide a substrate surface with corrosion resistance, nonstickiness, wear resistance, and chemical resistance. Such films are used over a broad temperature range, from low to high temperatures. Methods are known in the art for generating a corrosion-resistant film. Such methods include powder coating, sheet lining, and the like.

Generating a thick corrosion-resistant film by powder coating requires applying a superposed plurality of relatively thin films, each about 100 $\mu$m thick, because an attempt to generate such a thick film by a single application tends to result in a film which suffers from bubbling. Even a multiplicity of forming steps permits generating a film thickness of at most only about 1 mm, and frequently bubbling occurs.

Sheet lining is a method for applying pieces of 2–5 mm thick PFA or PTFE sheet, together with glass cloth backing, to a substrate for bonding by an adhesive, where the pieces are bonded together by welding. The resulting film, although thick, can only be used at temperatures lower than those which can be tolerated by the PFA or PTFE, because of the heat resistance of the adhesive used.

A rotational lining method has recently attracted attention as a way of overcoming the above deficiency by generating a thick film lining, 1–5 mm in thickness, by a single resin melting operation. Rotational lining is a method of application which calls for heating a rotating mold on which a film is to be generated, introducing an appropriate melt flowable resin powder into the mold, melt fusing the resin on the interior surface of the mold so that the resin reaches a given thickness and sticks to the mold. Objects so formed can be used for lined tanks, pipes, and the like.

However, a rotational lining method using PFA has not been practical. Because the resin shrinks more than the metal substrate used, the resin, once heat-fused to the substrate, develops an internal stress, resulting in a coating which peels off spontaneously soon after the formation of the coating or after standing for several days, or which peels off when subjected to several heating-cooling cycles. This kind of peeling cannot be prevented sufficiently by conditioning the substrate by blasting or by primer coating, and the problem worsens as the thickness of the coating increases.

Powder coating comprises adding a heat resistant filler powder into a resin layer and generating a relatively thin resin coated layer, 50–500 $\mu$m thick, which retards shrinkage and prevents peeling (Japanese Patent Application Publication 54-3172). However, a powder coating composition for generating the above thin film still does not exhibit satisfactory peel resistance when applied as a rotational lining for generating thick films, and fails to give a uniform lining coating because the powder composition bubbles or has poor melt flow.

PFA, near the molding temperature of 340° C.–380° C., tends to suffer from considerable bubbling, particularly if a thick film, and also fails to yield satisfactory coated films in rotational lining applications because of the bubbling phenomenon. The bubbling may occur because of the retention of gas generated by the thermal decomposition of unstable PFA end groups or the retention of gas due to insufficient deaeration of the powder and filler used. Rotational molding, in which the molded resin article formed by melt molding is removed from the mold, also suffers from a bubbling problem, but the bubbling can be prevented by treating the PFA resin powder with fluorine, thereby stabilizing any unstable end groups (Kokai 60-240713). However, a lining composition which contains a peel-preventing filler cannot be subjected to the fluorination treatment because the filler is attacked by fluorine. The bubbling of a coating, which reduces the essential thickness of the coating, considerably deteriorates the corrosion resistance of the lining.

Methods are known in the art for solving PFA bubbling in the case of coating or powder coating. These methods include utilizing heat stabilizers such as zinc or tin, or organic sulfur compounds such as benzoimidazole type mercaptans, and the like, thereby preventing the copolymer from bubbling (Japanese Patent Application Publication 57-14774). However, the use of zinc as a heat stabilizer for a PFA lining coating causes the film to crack, because zinc tends to be attacked by acids or alkalis, thereby allowing chemicals to penetrate. Such material is unsatisfactory as a corrosion resistant lining material for semiconductor manufacturing processes which cannot tolerate any metal-leaching contamination.

A process for decreasing the amount of zinc and using polyphenylene sulfide (hereafter PPS) at the same time (Japanese Patent Application Publication 63-38065), does not solve either the metal-leaching or the bubbling problem.

SUMMARY OF THE INVENTION

The present invention provides a PFA resin powder composition capable of providing, by a rotational lining process, a thick lining film which has excellent chemical resistance and heat resistance, and which does not peel or bubble.

Surprisingly, the resin powder composition of this invention, obtained by uniformly combining PFA particles, a small amount of PPS as a heat stabilizer, and a heat resistant filler into granules having specific physical properties, can provide a thick film having excellent resistance to bubbling and peeling.

More specifically, the present invention relates to a resin powder composition comprising granules which comprise tetrafluoroethylene/perfluoro(alkyl vinyl ether) copolymer particles, 0.05–5% by weight of polyphenylene sulfide particles having an average particle size of 0.3–50 μm, and a heat resistant filler, wherein said granules have an average size of 70–1,000 μm, and said composition has a porosity of not more than 0.74, a specific shrinkage of not more than 5.1%, and a melt flow rate that satisfies the following equation:

$$\log f \geq -0.70 \log \eta + 2.83,$$

where $f$ is the melt flow rate of the resin powder composition, and $\eta$ is the specific melt viscosity at 372° C. of the tetrafluoroethylene/perfluoro(alkyl vinyl ether) copolymer.

The present invention also provides processes for manufacturing the above resin powder composition. One process comprises mixing tetrafluoroethylene/perfluoro(alkyl vinyl ether) copolymer particles with polyphenylene sulfide and a heat resistant filler and granulating the mixture in the presence of water and an organic liquid. The other process comprises mixing tetrafluoroethylene/perfluoro(alkyl vinyl ether) copolymer particles with polyphenylene sulfide and a heat resistant filler, compression-molding, and pulverizing. Such a resin powder composition can produce thick film linings or coatings which are essentially free of gas bubbles, high in adhesion strength and high in peel resistance.

DETAILED DESCRIPTION OF THE INVENTION

Tetrafluoroethylene/perfluoro(alkyl vinyl ether) copolymers which can be used in this invention are copolymers of tetrafluoroethylene (hereafter TFE) and perfluoro(alkyl vinyl ethers) (hereafter PFVE), which copolymers are flowable at temperatures at or above their melting points, and which preferably have specific melt viscosities of $5 \times 10^3 \sim 1 \times 10^6$ poise at 372° C. A resin having a specific melt viscosity of less than $5 \times 10^3$ poise is poor in heat resistance and stress cracking resistance, making such a material unsatisfactory as a lining material. A resin having a specific melt viscosity exceeding $1 \times 10^6$ poise shows decreased melt flow as a powder composition after being mixed with a filler, so that rotational lining, a process in which no pressure is applied, fails to provide a uniform film due to a lack of uniform melt flow of such composition.

A suitable copolymer for use in this invention is a copolymer of TFE and PFVE, preferably a copolymer containing 0.5–10 mole percent of PFVE. A level of PFVE less than 0.5 mole percent results in poor flow, while a higher level of PFVE, which is expensive, increases manufacturing costs.

A commercial PPS resin powder can be used to make the resin powder composition of this invention, if the PPS particle size is not more than 50 μm, preferably not more than 20 μm. Smaller particle sizes are preferred. Particle sizes of greater than 50 μm will cause the dispersion state of PPS to be poor, causing it to lose its effect as a heat stabilizer because the PPS itself will become a significant source of bubbles.

The amount of PPS added is 0.05–5% by weight, preferably 0.1–2% by weight. A level less than 0.05% by weight fails to prevent bubbling; a level more than 5% by weight results in undesirable bubbling from PPS itself.

The resin powder composition of this invention preferably has a specific shrinkage as close to that of the substrate on which linings of such resin are formed, thereby preventing shrinkage of such linings. Therefore, the filler incorporated into the composition is desirably a heat resistant-type filler having a thermal shrinkage which, at most, is less than that of the PFA resin.

The filler used in this invention preferably has a melting point of at least 260° C. and a thermal decomposition temperature of at least 360° C. Any filler which accelerates the thermal decomposition of PFA, for example, natural graphite, is an unsuitable filler.

It is necessary to select a type of filler which is not attacked by the chemicals to which the coated object will be exposed.

Since it is necessary for the resin powder composition of this invention to have a particle size of 70–1,000 μm, the filler used must have a particle size smaller than about one-third of the desired particle size of the granules of the powder composition. A filler particle size greater than one-third of the granule size is undesirable due to poor dispersion of the filler into the PFA resin. A fibrous or flake-like filler is preferred due to its significant effect of decreasing the shrinkage of the resulting coating. A fibrous type filler should have an aspect ratio (length to diameter ratio) of at least 3. A filler having an excessively high specific surface area is not preferred due to its greater tendency for bubbling, but the suitable range depends on the particular filler type.

There is no particular limitation on the amount of filler used in this invention, but a level of not more than 50% by volume is preferred, because an excessive amount decreases melt flow, thereby deteriorating the film-forming capabilities and adversely affecting the coating's mechanical strength and chemical resistance.

The amount of filler added should be sufficient to decrease the specific shrinkage of the present resin powder composition to a level of not more than 5.1% to prevent peeling. The required amount will differ depending on the type and shape of the filler.

A filler is selected from among heat resistant fillers which are commonly mixed with fluororesins, taking into consideration the end use. It is permissible to use a combination of two or more fillers. Fillers which can be incorporated into the powder composition of this invention include metals or alloys, such as titanium, nickel, zirconium, tantalum, and stainless steel; inorganic compounds, such as glass fibers, glass flakes, glass beads, carbon fibers, carbon whiskers, silicon carbide, aluminum oxide, silicon nitride, zirconium oxide, zirconium silicate, and potassium silicate; and heat resistant polymers such as polyetheretherketone (PEEK), polyetherketone (PEK), Ekonol® aromatic polyester (trademark of British Chemical Products and Colours Ltd.), polyimide, polyamide imides, and aramid.

It is necessary that the resin powder composition of the present invention be in the physical form of granules of PFA particles in which particles of PPS and filler are uniformly dispersed. A simple uniform mixing (i.e., without granulation) will provide only a minimal effect in suppressing the bubbling of the PFA when generating a thick film.

A suitable resin powder composition incorporating both PPS and a heat resistant filler with PFA can be prepared by:

(1) mixing PFA particles with PPS and a heat resistant filler and granulating in the presence of water and an organic liquid; or (2) mixing PFA particles with PPS and a heat resistant filler, compression-molding, and pulverizing.

Specifically, process (1) can be carried out by either of the following processes:

Process (A):

PPS and a filler are added to, and mixed with, an aqueous PFA dispersion followed by flocculation, granulation, and drying. The flocculation of the aqueous dispersion is carried out by adding a water soluble inorganic salt or by adding a water soluble acid, which adjusts the pH to 0–6, followed by adding an organic liquid and granulating. The acids or inorganic salts which may be added can be selected from nitric acid, hydrochloric acid, ammonium chloride, ammonium carbonate, and the like. The product is then permitted to undergo a thermal fusion between primary particles, while retaining the shape of the flocculated particles, followed by sifting. The heat treatment step may be carried out during rotational lining.

Process (B):

PFA polymer particles are dried, uniformly mixed with PPS and a filler, agitated in the presence of water and an organic liquid for granulation, dried, and thermally fused together while retaining the shape of granulated particles. The heat treatment step may be carried out during rotational lining.

Organic solvents which can be used in the above Process (A) include those having a surface tension of 15–40 dyne/cm, such as trifluorotrichloroethane and perchloroethylene. A water-soluble organic liquid such as methanol can also be used in Process (B).

Process (2) calls for drying the PFA polymer particles, adding PPS and a heat resistant filler, and mixing in a mixer, such as a Henschel mixer, to give a uniform powder, compression-molding the resulting mixed powder, and pulverizing to give a powder composition. Shaping can be carried out by placing a mixed powder in a mold, pressing by a hydraulic press into block form or by using a roller to shape continuously into sheet form, or the like. After pulverization, optionally a heat treatment or sifting is carried out.

The granules of the resin powder composition of this invention have an average size of 70–1,000 μm, preferably 100–500 μm. A size less than 70 μm will cause a mutual fusion of the granules into large granules before generating a film during rotational molding or lining to give an uneven film, while a granule size greater than 1,000 μm gives poor film forming capability and poor surface flatness.

The resin powder composition of this invention has a porosity of not more than 0.74, preferably not more than 0.65. A porosity greater than 0.74 causes difficulty in the formation of a film during lining, which either makes it difficult for gas bubbles to escape or fails to provide surface smoothness. The term porosity of a powder composition is defined as the ratio of the volume of space within the powder layer to the volume of the bulk, which can be calculated by the following equation:

Porosity=1−(Apparent Specific Gravity of the Powder/True Specific Gravity of the Substance Which Constitutes the Powder)

Rotational lining is carried out by introducing the present resin powder composition into a mold within an oven and raising the temperature to a molding temperature while rotating the mold. If the granules of the present resin powder composition fracture during heating up to the melt temperature, the PPS and the filler contained in the granules will be unevenly distributed, thereby resulting in a loss of bubbling resistance or the formation of fine power, thereby producing a rough lining surface. To prevent this phenomenon, it is preferred to heat treat the present resin powder composition at 265° C.–310° C. during its manufacture, so as to thermally fuse only the surfaces of the PFA particles to themselves, thereby providing the granules with some mechanical strength (resistance to fracture). The heat treatment can also be carried out in a rotational lining molding process.

The film forming capability during rotational lining is appreciably affected by the melt flow of the composition, because the mold rotates, but essentially does not exert any pressure on the resin, and also because the composition is loaded with a filler. The melt flow of the powder composition of this invention must be at least above a certain value. The lower limit is determined in relation to the specific melt viscosity of PFA. The melt flow rate, $f$, for a PFA with a specific melt viscosity, $\eta$, at 372° C. must satisfy the following relationship:

$$\log f \geqq -0.70 \log \eta + 2.83.$$

The melt flow rate can be obtained by the following relationship: A disk of diameter $d_o$ (nominally 25 mm) and is punched out of a melt compression molded sheet of thickness t (nominally 2 mm) and is placed on a sheet of 1 mm thick mild steel which has been buffed with #600 sandpaper. The sample is heated in a hot air circulating oven at 310° C. for 30 minutes and heated for an additional hour at 360° C. The sample is removed from the oven and allowed to cool to room temperature.

The diameter ($d_1$) of the resin which has spread on melting is measured and the following relationship is used to compute the melt flow rate:

$$\text{Melt Flow Rate} = (d_1 - d_0)/2t$$

Because of the substantial difference in thermal expansion and shrinkage between the substrate to be coated and PFA resin after exposure to the coating temperature, a film formed from this resin on the substrate may shrink upon cooling to room temperature, even though such film may have had good adhesion at the time of coating, causing a peeling or cracking problem, particularly in the case of a thick film. It has been discovered that the peeling problem, even with thick films, can be solved by incorporating a filler such that the amount of specific shrinkage of the film is not more than 5.1%.

Specific shrinkage is obtained in the following manner: A 125×25×2 mm thick strip test piece is cut out of a 2 mm melt compression molded sheet of a PFA resin powder composition. Two parallel lines, about 100 mm apart, are drawn on a sheet of mild steel which has been buffed with #600 sandpaper, and the test piece is placed on these two lines. The mild steel sheet, with the test piece on it, is heated at 310° C. for 30 minutes and at 360° C. for 60 minutes. It is removed from the oven and allowed to cool to room temperature, after which the test piece is left standing for 12 hours in hot water at 80° C., so as to permit peeling apart with no distortion. The peeled off test piece is then annealed for 3 hours at 260° C.

Specific shrinkage in percent is calculated by the following equation based on the length ($L_1$) between two marked-off line tracings remaining on the test piece and the length ($L_0$) between the marked-off lines on the mild steel sheet: Percent Specific Shrinkage=$(L_0-L_1)/L_0 \times 100$.

The resin powder composition of this invention can be used for lining a substrate to which conventional PFA linings are applied, for example, heat-resistant substrates having melting points higher than that of PFA, such as metals and alloys including steel, stainless steel, aluminum, nickel, and ceramics; glass; and the like.

If these substrates are to be surface treated, a conventional surface treatment such as sandblasting, primer application, and the like, can be used. It is preferred to treat a substrate with a primer before lining. A surface treatment by a phosphoric chromic-acid acid type primer is particularly effective for enhancing chemical resistance or adhesion strength. This primer should be heat treated to 350° C. or higher, preferably to at least 400° C., to prevent bubbling.

Since the resin powder composition of this invention has excellent peel resistance, it is possible to further improve the chemical resistance, soil resistance, and nonstickiness by overlaying a filler-free PFA resin layer on a film comprising the resin powder composition of this invention.

The resin powder composition of this invention, when applied by rotational lining, is capable of generating thick, peel- or bubble-free, and highly surface-smooth films on pipes, tanks, flanges, joints, pumps, heat-exchangers, hoppers, and the like, for applications which require corrosion-resistance, wear-resistance and nonstickiness.

EXAMPLES

The present invention is exemplified by the following nonlimiting examples.

Preparation of Resin Powder Composition

Example 1

To 2675 g of an aqueous PFA dispersion [Teflon ® 340-J Dispersion: 28 wt % solids, average particle size of 0.2 μm, surface area of 33 m²/cm³, and melting point of 309° C.] were added 250 g of a pre-water dispersion of a glass fiber (Nittobo K.K., PF A 001 which had been hydrophobically-treated with silicone oil (SH200: Toray Silicone Co., Ltd.)), and 1 g of PPS (Toso Susteel Ryton ® V-1, a pulverized V-1 grade: average particle size 14 μm), followed by flocculation by stirring and adding 52 g of 61% nitric acid and 600 g of trifluorotrichloroethane. These flocculated particles were heat treated 12 hours at 300° C. After cooling, they were sifted through a sieve with 1 mm openings to obtain a composition having an average particle size of 270 μm.

Example 2

To PFA dry flocculated particles (obtained by a fluocculation operation as in the case of Example 1, except for not incorporating a filler by means of an aqueous dispersion, thereby generating PFA particles, which were then dried for 10 hours at 150° C.), were added 250 g of the same glass fiber (hereafter GF as used in Example 1) and 10 g of PPS, followed by mixing 10 minutes in a Henschel mixer (Mitsui Miike K.K., FM10B type) at 3,000 rpm for 10 minutes, reducing the speed of revolution to 1,000 rpm, adding in small increments 150 g of water and 500 g of trifluorotrichloroethane, and increasing the speed of revolution to 3,000 rpm so as to agitate for one minute to give a granulated product. This was heat treated for 12 hours at 300° C. and sifted in a manner similar to that of Example 1 to obtain a composition with an average particle size of 340 μm.

Example 3

Example 2 was repeated except for not providing any heat treatment step but only drying for 10 hours at 150° C., followed by sifting to obtain a composition having an average particle size of 394 μm.

Example 4

A method similar to Example 2 was used to obtain a composition containing 25% by weight of GF and 3% by weight of PPS and having an average particle size of 295 μm.

Example 5

A method similar to Example 2 was used to obtain a composition containing, instead of glass fiber, carbon fiber (Kureha Kagaku Kogyo K.K., M-2007S, 14.5 μm in diameter × 100 μm in length; surface area 0.4 m²/g) and having an average particle size of 318 μm.

Example 6

A method similar to Example 1 was used to obtain a composition containing, instead of GF, 10% by weight of PEEK (Mitsui Toatsu Kagaku K.K., Victrex ® 150 PFF, average particle size of 40 μm), as well as 1% by weight of PPS and having an average particle size of 405 μm.

Example 7

A method similar to Example 2 was used to obtain a composition containing 10% by weight of PEEK, 10% by weight of GF, and 1% by weight of PPS and having an average particle size of 350 μm.

Example 8

2,675 g of an aqueous PFA dispersion (Teflon ® 345-J dispersion: 28% by weight solids, average particle size 0.2 μm, surface area 33 m²/cm3, melting point 309° C., a specific melt viscosity of $9 \times 10^4$ poise at 372° C.) was flocculated while being stirred with 52 g of 61% of nitric acid and then with 600 g of trifluorotrichloroethane. The flocculated particles were dried 10 hours at 150° C. and mixed with 250 g of the same GF as that used in Example 1 and 10 g of PPS to generate a composition of an average particle size of 310 μm by a method similar to that of Example 2.

Example 9

A composition of an average particle size of 290 μm was prepared in a manner similar to that of Example 8, except for replacing the aqueous PFA dispersion of Example 8 by a Teflon ® 350-J dispersion3(28% by weight solids, average particle size 290 μm, surface area 33 m²/cm³, melting point 309° C., a specific melt viscosity of 3×10⁵ poise at 372° C.).

Example 10

740 g of the same PFA dried flocculated particles as those used in Example 2 was mixed with 250 g of the same GF as that used in Example 1 and 10 g of PPS in a Henschel mixer (Mitsui Miike K.K., FM10B type) at 3,000 rpm for 10 minutes to give a powder. The resultant powder was placed in a mold, pressed to a pressure of 800 kg/cm² by a hydraulic press into block form. The resultant block product was pre-crushed by a hammer and then pulverized by a pulverizer (Mitsui Miike K.K. Condux centrifuge mill 280 CSK type: speed of revolutions 2300 rpm, a screen opening of $\phi$ 1.8 mm), followed by heat treating and sifting in a manner similar to that of Example 1 to obtain a composition having an average particle size of 330 μm.

Control Example 1

Example 2 was repeated except for using 1% by weight of PPS having a particle size of 180 μm (Chuko Kasei Kogyo K.K., PR-200) to obtain a composition having an average particle size of 270 μm.

Control Example 2

Example 2 was repeated except for using 25% by weight of GF and 7% by weight of PPS (Toso Susteel Ryton® V-1 pulverizer product) having an average particle size of 325 μm.

Control Example 3

Example 2 was repeated except for using 25% by weight of GF and 1% by weight of PPS (Toso Susteel Ryton® V-1 pulverized product) to give a composition having an average particle size of 1380 μm.

Control Example 4

Example 2 was repeated except for using 25% by weight of GF and 1% by weight of PPS (Toso Susteel Ryton® V-1 pulverized product) to give a composition having an average particle size of 50 μm.

Control Example 5

A flocculation operation similar to that of Example 1 was performed except for the use of a filler-free aqueous dispersion to obtain 300 μm of dried, flocculated PFA particles, which were dried 12 hours at 300° C. 740 g of the resultant particles was mixed with 250 g of GF (Nittobo K.K.) and 10 g of PPS (Toso Susteel Ryton® V-1 pulverized grade: GF average particle size of 14 μm) in a Henschel mixer (Mitsui Miike K.K., FM10B type) (3,000 rpm for 10 minutes) to obtain a composition containing 25% by weight of GF and 1% by weight of PPS.

Control Example 6

Example 1 was repeated except for not adding any GF, to give a composition loaded with only 1% by weight of PPS (Toso Susteel Ryton® V-1 pulverized product) and having an average particle size of 400 μm.

Control Example 7

Example 1 was repeated except for obtaining a composition containing 50% by weight of GF and 1% by weight of PPS and having an average particle size of 295 μm. The resultant resin powder composition had a melt flow rate of 0.41, smaller than the melt flow rate of 0.42 calculated by log $f = -0.70$ log $\eta + 2.83$.

Control Example 8

Example 1 was repeated except for obtaining a composition containing instead only 30% by weight of carbon fiber (Kureha Kagaku Kogyo K.K.) and having an average particle size of 155 μm.

Control Example 9

Example 1 was repeated except for obtaining a composition containing instead of only 10% by weight of PEEK (Mitsui Toatsu Kagaku K.K., Victrex 15) having an average particle size of 400 μm.

Control Example 10

Example 1 was repeated except for obtaining a composition containing instead no filler and only PFA and having an average particle size of 330 μm.

Control Example 11

A composition having an average particle size of 300 μm was obtained by a method similar to that of Control Example 10, except for using a PFA (Mitsui Du Pont Flurorochemical K.K., TE9738-J) obtained by fluorinating PFA 345-J flocculated particles, used in Example 8.

Control Example 12

The filler-free PFA flocculated particles obtained by the flocculation operation of Example 8 were dried for 10 hours at 150° C. and used to obtain, by a method similar to that of Example 2, a composition of an average particle size of 320 μm containing 50% by weight of GF and 1% by weight of PPS (Toso Susteel Company). The resultant resin powder composition had a melt flow rate of 0.19, smaller than the melt flow rate of 0.23, calculated by log $f = -0.70$ log $\eta + 2.83$.

Control Example 13

The filler-free PFA flocculated particles obtained by the flocculation operation of Example 9 were dried for 10 hours at 150° C. and used to obtain, by a method similar to that of Example 2, a composition of an average particle size of 320 μm containing 50% by weight of GF and 1% by weight of PPS (Toso Susteel Company). The resultant resin powder composition had a melt flow rate of 0.09, smaller than the melt flow rate of 0.10, calculated by log $f = -0.70$ log $\eta + 2.83$.

Film Molding Test

Resin powder compositions from the above Examples of this invention and Control Examples were used to carry out lining on substrates by the following methods to evaluate the properties of lining films. The results are summarized in Table 1 (Examples of this invention) and Table 2 (Control Examples) for film formability, resistance to bubbling, resistance to peeling, and surface smoothness.

The film molding test and methods of evaluation for the lining films are as follows:

(A) Short Tube Lining Test

| Lining Method | |
| --- | --- |
| Tubes Used for Lining | 3B black tube (o.d. 89 mm × i.d. 81 mm × length 150 mm) #60 |

-continued

| | Lining Method |
|---|---|
| Primer | alumina sandblasted. 850-314/VM7799 (Du Pont Company), 400° C × 1 hour baking |
| Rotational Molding Machine | Tamagawa Kikai K.K., Double screw 100 L rotary molding machine, 3.5 rpm revolution and 5 rpm rotation |
| Amount of Powder Composition | 200 g - film thickness, 2 mm |
| Temperature Conditions | A mold with a powder composition was placed in an electrical oven at 320° C., heated and baked at 340° C. for 180 minutes and 360° C. for 120 minutes, and cooled. |

Evaluation of Lined Film (1) Film Forming Capability and Surface Smoothness

The lined tube was allowed to cool to room temperature and a visual inspection was carried out of the film forming capability and surface smoothness of the lined films.

| Five grades were given: | ∅ for excellent for all the test items; 0 for good; Δ for somewhat poor X for poor XX for extremely poor |
|---|---|

(2) Peel Resistance

The peel resistance of a given film was evaluated by carrying out a heat cycle test under the following conditions in accordance with the ASTM-F781 PFA pipe lining test:

| One Cycle: | 260° C. × 3 hr, −20° C. × 1 hr |
|---|---|
| ∅: | No peel to 50 cycles |

-continued

| 0 | No peel to 3 cycles, but slight peel at 50 cycles |
|---|---|
| Δ: | Slight peel at 3 cycles |
| X: | Peels at 3 cycles |
| XX: | Peeled off after lining |

(3) Resistance to Bubbling

The lined film was sliced by a cutter and the number of gas bubbles in the cross section were counted (50 mm in length).

| ∅: | Number of gas bubbles: 0 |
|---|---|
| 0 | 1–3 |
| Δ: | 4–10 |
| X: | More than 10 |
| XX: | More than 10, large bubbles |

(B) Top Coating

Samples judged to show no peel according to Test (A) (those marked by ∅ and 0 in Table 1) were tested by overlaying on such a coated layer a 1 mm thick PFA resin layer free of any filler; then an evaluation was made as to whether or not any peel occurred.

| | Molding Conditions: |
|---|---|
| Rotational Molding Machine | Tamagawa Kikai K.K.; Double screw 100 L rotary molding machine, 3.5 rpm revolution and 5 rpm rotation |
| PFA Resin | TE9738-J (Mitsui Du Pont Fluorochemicals, Fluorinated PFA), 100 g |

Temperature Conditions:

- A mold having a powder composition was placed in an electrical oven at 320° C., heated and baked at 360° C. for 300 minutes, and cooled.
- Samples which did not peel were marked by 0.

TABLE 1

| Ex. | PFA Specific Melt Viscosity (×10⁴ poise) | PPS Added (wt %) | Amount of Heat Resistant Filler Added (wt %) | | | Average Particle Size (μm) | Porosity | Melt Flow Rate | % Specific Shrinkage (%) | Short Tube Lining Test | | | | Top Coat Peel Test |
|---|---|---|---|---|---|---|---|---|---|---|---|---|---|---|
| | | | GF | CF | PEEK | | | | | Film Forming Capability | Resistance to Bubbling | Resistance to Peeling | Surface Smoothness | |
| 1 | 3.8 | 0.1 | 25 | | | 270 | 0.46 | 1.15 | 3.61 | ∅ | ∅ | ∅ | ∅ | 0 |
| 2 | 3.8 | 1 | 25 | | | 340 | 0.46 | 1.09 | 3.55 | ∅ | ∅ | ∅ | ∅ | 0 |
| 3 | 3.8 | 1 | 25 | | | 394 | 0.63 | 1.09 | 3.55 | ∅ | ∅ | ∅ | 0 | 0 |
| 4 | 3.8 | 3 | 25 | | | 295 | 0.46 | 1.00 | 3.45 | 0 | ∅ | ∅ | 0 | 0 |
| 5 | 3.8 | 1 | — | 20 | | 318 | 0.54 | 1.10 | 2.66 | ∅ | 0 | ∅ | ∅ | 0 |
| 6 | 3.8 | 1 | — | | 10 | 405 | 0.59 | 1.24 | 4.63 | ∅ | ∅ | 0 | ∅ | 0 |
| 7 | 3.8 | 1 | 10 | | 10 | 350 | 0.54 | 0.88 | 4.12 | 0 | ∅ | 0 | ∅ | 0 |
| 8 | 9.0 | 1 | 25 | | | 310 | 0.47 | 0.59 | 3.55 | ∅ | ∅ | ∅ | ∅ | 0 |
| 9 | 30.0 | 1 | 25 | | | 290 | 0.47 | 0.27 | 3.55 | ∅ | ∅ | ∅ | ∅ | 0 |
| 10 | 3.8 | 1 | 25 | | | 330 | 0.46 | 1.09 | 3.55 | ∅ | ∅ | ∅ | ∅ | 0 |

TABLE 2

| Ex. | PFA Specific Melt Viscosity (×10⁴ poise) | PPS Added (wt %) | Amount of Heat Resistant Filler Added (wt %) | | | Average Particle Size (μm) | Porosity | Melt Flow Rate | % Specific Shrinkage (%) | Short Tube Lining Test | | | |
|---|---|---|---|---|---|---|---|---|---|---|---|---|---|
| | | | GF | CF | PEEK | | | | | Film Forming Capability | Resistance to Bubbling | Resistance to Peeling | Surface Smoothness |
| 1 | 3.8 | 1 | 25 | | | 270 | 0.51 | 1.09 | 3.55 | Δ | X | — | — |
| 2 | 3.8 | 7 | 25 | | | 325 | 0.46 | 0.91 | 3.23 | 0 | X | — | — |
| 3 | 3.8 | 1 | 25 | | | 1380 | 0.52 | 1.09 | 3.55 | XX | — | — | — |

TABLE 2-continued

| Ex. | PFA Specific Melt Viscosity ($\times 10^4$ poise) | PPS Added (wt %) | Amount of Heat Resistant Filler Added (wt %) | | | Average Particle Size (μm) | Porosity | Melt Flow Rate | % Specific Shrinkage (%) | Short Tube Lining Test | | | |
|---|---|---|---|---|---|---|---|---|---|---|---|---|---|
| | | | GF | CF | PEEK | | | | | Film Forming Capability | Resistance to Bubbling | Resistance to Peeling | Surface Smoothness |
| 4 | 3.8 | 1 | 25 | | | 50 | 0.70 | 1.09 | 3.55 | Δ | Δ | 0 | XX |
| 5 | 3.8 | 1 | 25 | | | — | 0.46 | 1.11 | 3.50 | Δ | X | — | Δ |
| 6 | 3.8 | 1 | | | | 400 | 0.51 | 1.84 | 5.57 | ∅ | ∅ | X | ∅ |
| 7 | 3.8 | 1 | 50 | | | 295 | 0.72 | 0.41 | 2.43 | XX | — | — | — |
| 8 | 3.8 | — | — | 30 | | 155 | 0.75 | 1.10 | 3.05 | 0 | XX | — | — |
| 9 | 3.8 | — | — | | 10 | 400 | 0.60 | 1.23 | 4.65 | 0 | X | — | Δ |
| 10 | 3.8 | No Addition (PFA Only) | | | | 330 | 0.50 | 1.84 | 6.00 | X | XX | — | — |
| 11 | 9.0 | Fluorinated PFA | | | | 300 | 0.49 | 1.32 | 5.98 | ∅ | ∅ | XX | ∅ |
| 12 | 9.0 | 1% | 50% | | | 320 | 0.72 | 0.19 | 2.43 | XX | — | — | — |
| 13 | 30.0 | 1% | 50% | | | 300 | 0.72 | 0.09 | 2.43 | XX | — | — | — |

What is claimed is:

1. A rotational lining which is smooth, non-peeling from the surface on which it is made and being essentially bubble-free, said lining being made from a resin powder composition, comprising granules which consist essentially of tetrafluoroethylene/perfluoro(alkyl vinyl ether) copolymer particles, 0.05–5% by weight of polyphenylene sulfide particles having an average particle size of 0.3–50 μm, and a heat resistant filler, wherein said granules have an average size of 70–1,000 μm, and said composition has a porosity of not more than 0.74, a specific shrinkage of not more than 5.1%, and a melt flow rate that satisfies the following equation:

$$\log f \geq -0.70 \log \eta + 2.83,$$

where $f$ is the melt flow rate of the resin powder composition, and n is the specific melt viscosity at 372° C. of the tetrafluoroethylene/perfluoro(alkyl vinyl ether) copolymer.

2. The rotational lining of claim 1 in which the tetrafluoroethylene/perfluoro(alkyl vinyl ether) copolymer has a specific melt viscosity of $5 \times 10^3 \sim 1 \times 10^6$ poises at 372° C.

3. In the process of forming a rotational lining on a surface from granules of a composition consisting essentially of tetrafluoroethylene/perfluoro (alkyl vinyl ether) copolymer particles and heat resistant filler, the improvement comprising carrying out the formation of said rotational lining by (a) utilizing granules of said composition prepared so that it has
   (i) an average particle size of 70–1000 μm,
   (ii) a porosity of not more than 0.74,
   (iii) a specific shrinkage of not more than 5.1%, and
   (iv) a melt flow rate that satisfies the following equation:

$$\log f \geq -0.70 \log \eta + 2.83$$

where $f$ is the melt flow rate of the resin powder composition and $\eta$ is the specific melt viscosity at 372° C. of the copolymer, and (b) incorporating into said composition from 0.05–5% by weight of polyphenylene sulfide particles having an average particle size of 0.3–50 μm to thermally stabilize said composition during the formation of said rotational lining to obtain as a resultant thereof a smooth, non-peeling, essentially bubble-free lining on said surface.

* * * * *